(12) United States Patent
Iwakura et al.

(10) Patent No.: US 7,820,330 B2
(45) Date of Patent: Oct. 26, 2010

(54) ALKALINE STORAGE BATTERY AND METHOD FOR PRODUCING THE SAME

(75) Inventors: Chiaki Iwakura, Sakai (JP); Naoji Furukawa, Yawata (JP); Yoshitaka Dansui, Fujisawa (JP); Yoichi Izumi, Habikino (JP)

(73) Assignee: Panasonic Corporation, Osaka (JP)

( * ) Notice: Subject to any disclaimer, the term of this patent is extended or adjusted under 35 U.S.C. 154(b) by 1220 days.

(21) Appl. No.: 11/052,823

(22) Filed: Feb. 9, 2005

(65) Prior Publication Data

US 2005/0186478 A1    Aug. 25, 2005

(30) Foreign Application Priority Data

Feb. 23, 2004    (JP)    ............................. 2004-045912

(51) Int. Cl.
*H01M 2/16*    (2006.01)

(52) U.S. Cl. ........................ 429/251; 429/249; 29/623.5

(58) Field of Classification Search ........................ None
See application file for complete search history.

(56) References Cited

U.S. PATENT DOCUMENTS

| 5,541,019 | A | 7/1996 | Anani et al. |
| 6,706,442 | B1 | 3/2004 | Sakamoto et al. |
| 7,022,434 | B2 | 4/2006 | Iwakura et al. |
| 2004/0005503 | A1* | 1/2004 | Iwakura et al. .............. 429/303 |

FOREIGN PATENT DOCUMENTS

| CN | 1322381 A | 11/2001 |
| CN | 1443381 A | 9/2003 |
| JP | 5-258767 | 10/1993 |
| JP | 2002-033093 | 1/2002 |
| WO | WO 00/21148 | * 4/2000 |
| WO | WO 02/23663 A1 | 3/2002 |

OTHER PUBLICATIONS

Ogawa, Hiromichi., et al. "Metal Hydride Electrode for High Energy Density Sealed Nickel-Metal Hydride Battery." Power Sources 12, Research and Development in Non-mechanical Electrical Power Sources, 1988, pp. 393-410.

* cited by examiner

*Primary Examiner*—Jonathan Crepeau
(74) *Attorney, Agent, or Firm*—McDermott Will & Emery LLP (57) ABSTRACT

An alkaline storage battery includes: a positive electrode containing nickel hydroxide; a negative electrode; a separator layer intervening between the positive electrode and the negative electrode; and an alkaline electrolyte. The separator layer includes a water-absorbing polymer, a water repellent, an alkaline aqueous solution, and a scavenger capable of trapping an element which leaches from the negative electrode into the alkaline aqueous solution. The scavenger comprises an oxygen-containing metal compound. The negative electrode is a hydrogen storage alloy electrode, a cadmium electrode or a zinc electrode. The water-absorbing polymer comprises a cross-linked polymer having at least one kind of monomer unit selected from the group consisting of an acrylate unit and a methacrylate unit.

11 Claims, 1 Drawing Sheet

FIG. 1

ALKALINE STORAGE BATTERY AND METHOD FOR PRODUCING THE SAME

BACKGROUND OF THE INVENTION

Alkaline storage batteries, such as nickel-metal hydride storage batteries, nickel-cadmium storage batteries, and nickel-zinc storage batteries, include a positive electrode, a negative electrode, a separator intervening between the positive electrode and the negative electrode, and an alkaline electrolyte. The positive electrode is a nickel electrode containing nickel hydroxide, and the negative electrode is a hydrogen storage alloy electrode, a cadmium electrode, a zinc electrode, or the like. Also, the separator is commonly made of a polyolefin non-woven fabric, and the alkaline electrolyte is an aqueous potassium hydroxide solution or the like (Power Sources 12, Research and Development in Non-mechanical Electrical Power Sources, 1988, pages 393-410).

The above-described conventional alkaline storage batteries have the following problems.

In the case of nickel-metal hydride storage batteries, when they are repeatedly charged and discharged at high temperatures, the hydrogen storage alloy contained in their negative electrode reacts with an electrolyte and thus corrodes to produce an oxide or hydroxide. Since this reaction consumes water contained in the electrolyte, the occurrence of corrosion of the alloy decreases the electrolyte retained in the separator, increases the internal resistance of the battery, and shortens the life of the battery. Also, due to the corrosion, constituent elements of the hydrogen storage alloy leach into the electrolyte and pass through the separator to reach the positive electrode. This promotes the self-discharge of the battery, thereby resulting in a degradation in capacity retention performance. Therefore, in order to suppress the corrosion of the hydrogen storage alloy, active research has conventionally been conducted on the composition of the hydrogen storage alloy, the surface treatment of the alloy and the like.

In the case of nickel-zinc storage batteries, zinc and/or zinc oxide contained in the zinc electrode are highly soluble in an alkaline electrolyte. Therefore, such batteries are susceptible to the formation of dendrites with charge and discharge cycles. Dendrites are a cause of internal short-circuits.

In view of the problems as described above, improvement of the separator has been attempted.

For example, there has been a report that improving the hydrophilicity of the separator prevents the internal resistance of a battery from rising even when the amount of the electrolyte is decreased in the battery. However, since an additional process is necessary for improving the hydrophilicity of the separator, there is a problem of increasing the manufacturing costs of batteries.

Also, Japanese Laid-Open Patent Publication No. Hei 5-258767 proposes the inclusion of a water-absorbing polymer in an electrolyte, in order to obtain an alkaline storage battery with little self-discharge during storage. This method, however, has a drawback in that the water-absorbing polymer is unevenly distributed between the positive electrode and the negative electrode. Thus, the battery reaction proceeds unevenly, so that there is little expectation of cycle life improvement.

Meanwhile, U.S. Pat. No. 5,541,019 proposes the use of a polymer electrolyte in nickel-metal hydride storage batteries, in order to prevent leakage of the electrolyte. However, if sealed nickel-metal hydride storage batteries are overcharged, electrolysis of water occurs, thereby resulting in gas generation. In this case, there is a problem in that the inner pressure of the battery tends to rise, because the polymer electrolyte has low gas permeability.

In view of the above problems, Japanese Laid-Open Patent Publication No. 2002-33093 proposes the use of a separator layer including a water-absorbing polymer, a water repellent and an alkaline aqueous solution in nickel-metal hydride storage batteries, in order to improve both hydrophilicity and gas permeability.

Further, International Publication WO 02/23663 proposes the use of a separator layer including non-woven fabric and a water-absorbing polymer in nickel-zinc storage batteries, in order to enhance the ability to retain an alkaline aqueous solution while limiting the movement of zinc leached in an electrolyte to suppress the formation of dendrites.

BRIEF SUMMARY OF THE INVENTION

As described above, various techniques have been proposed to improve the separator, but they have failed to sufficiently solve problems caused by the elements leached from the negative electrode upon the repetition of charge and discharge cycles, for example, the self-discharge of batteries and the formation of dendrites. Specifically, the proposed techniques have failed to prevent sufficiently the phenomenon of self-discharge promoted by the elements that have leached from the hydrogen storage alloy electrode and passed through the separator to the positive electrode, and the phenomenon of formation of dendrites by the elements leached from the zinc electrode. Thus, the effects of such techniques are limited.

Under such circumstances, the present invention proposes an effective means for relieving the problems resulting from the elements leached from the negative electrode. Accordingly, an alkaline storage battery in accordance with the present invention has a long cycle life and little self-discharge, while enabling low manufacturing costs.

The present invention relates to an alkaline storage battery including: a positive electrode containing nickel hydroxide; a negative electrode; a separator layer intervening between the positive electrode and the negative electrode; and an alkaline electrolyte. The separator layer includes a water-absorbing polymer, a water repellent, an alkaline aqueous solution, and a scavenger capable of trapping an element which leaches from the negative electrode into the alkaline aqueous solution, and the scavenger comprises an oxygen-containing metal compound.

The oxygen-containing metal compound, serving as the scavenger included in the separator layer, traps metal ions leached from the negative electrode in the separator layer.

The present invention is applicable to alkaline storage batteries in general. Thus, the present invention is applicable to nickel-metal hydride storage batteries in which the negative electrode is a hydrogen storage alloy electrode, nickel-cadmium storage batteries in which the negative electrode is a cadmium electrode, nickel-zinc storage batteries in which the negative electrode is a zinc electrode, and the like.

It is noted that the hydrogen storage alloy electrode contains a hydrogen storage alloy, the zinc electrode contains zinc and/or zinc oxide, and that the cadmium electrode contains cadmium and/or cadmium oxide. In addition to such substances, these electrodes can contain a binder, such as a water-soluble resin and rubber particles comprising a copolymer. Also, they can further contain additives, such as a thickener of carboxymethyl cellulose, and the like.

The water-absorbing polymer preferably comprises a cross-linked polymer having at least one kind of monomer unit selected from the group consisting of an acrylate unit and a methacrylate unit.

The water repellent preferably comprises carbon fluoride and/or fluorocarbon resin. Preferable examples of the fluorocarbon resin include polytetrafluoroethylene.

The separator layer can include a core material comprising non-woven fabric. For example, conventionally-used non-woven fabrics composed mainly of polyolefin and/or polyamide may be used.

The separator layer can be bonded to at least one of a surface of the positive electrode and a surface of the negative electrode.

The separator layer can further include a binder for holding the oxygen-containing metal compound. It is preferred to use, as the binder, at least one selected from the group consisting of polyethylene, polypropylene, carboxymethyl cellulose, styrene butadiene rubber and polyvinyl alcohol.

The separator layer desirably has a thickness of 20 to 200 μm.

The oxygen-containing metal compound is preferably at least one selected from the group consisting of a metal oxide and a metal hydroxide.

The oxygen-containing metal compound is preferably at least one selected from the group consisting of zinc oxide, iron oxide, magnesium oxide, manganese oxide, aluminum oxide, chromium oxide, vanadium oxide, titanium oxide, cobalt oxide and calcium hydroxide.

The amount of the oxygen-containing metal compound contained in the separator layer is preferably not less than 0.02 part by weight and not more than 0.5 part by weight per 100 parts by weight of the water-absorbing polymer.

The present invention also relates to a method for producing an alkaline storage battery, including the steps of: producing a positive electrode containing nickel hydroxide; producing a negative electrode; preparing a mixture of a water-absorbing polymer, a water repellent, an alkaline aqueous solution, and an oxygen-containing metal compound; forming the mixture into sheet form to prepare a separator layer (polymer sheet); layering the positive electrode and the negative electrode with the separator layer interposed therebetween, to obtain an electrode group; and assembling an alkaline storage battery using the electrode group.

The present invention further relates to a method for producing an alkaline storage battery, including the steps of: producing a positive electrode containing nickel hydroxide; producing a negative electrode; preparing a mixture of a water-absorbing polymer, a water repellent, an alkaline aqueous solution, and an oxygen-containing metal compound; applying the mixture onto at least one of a surface of the positive electrode and a surface of the negative electrode, to prepare a separator layer; layering the positives electrode and the negative electrode with the separator layer intervening therebetween, to obtain an electrode group; and assembling an alkaline storage battery using the electrode group.

According to the present invention, the elements leached from the negative electrode with charge and discharge cycles are trapped by the oxygen-containing metal compound contained in the separator layer. Therefore, it is possible to obtain an alkaline storage battery with a long cycle life and little self-discharge. Also, since the oxygen-containing metal compound is easy to handle and inexpensive, the alkaline storage battery of the present invention can be manufactured at low costs.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The present invention relates to an alkaline storage battery comprising a positive electrode containing nickel hydroxide, a negative electrode, a separator layer intervening between the positive electrode and the negative electrode, and an alkaline electrolyte. The alkaline storage battery according to the present invention includes an improved separator layer.

The alkaline storage battery of the present invention has a separator layer including a water-absorbing polymer, a water repellent, an alkaline aqueous solution, and a scavenger capable of trapping an element which leaches from the negative electrode into the alkaline aqueous solution, between the positive electrode containing nickel hydroxide and the negative electrode. The scavenger comprises an oxygen-containing metal compound.

Since the separator layer contains the alkaline aqueous solution, it has an appropriate ionic conductivity. It is noted that the alkaline aqueous solution is usually the same in composition as the alkaline electrolyte, and that the alkaline aqueous solution contained in the separator layer functions as the alkaline electrolyte.

Since the separator layer contains the water-absorbing polymer, its ability to retain the electrolyte is high, thereby making it unlikely for the internal resistance to rise. Also, the water-absorbing polymer, in combination with the alkaline aqueous solution, forms a gel electrolyte. A gel electrolyte is less likely to cause the corrosion of the hydrogen storage alloy, the leaching of zinc and the like than an alkaline aqueous solution. Therefore, the self-discharge of nickel-metal hydride storage batteries and the formation of dendrites in nickel-zinc storage batteries are also suppressed.

Since the separator layer contains the water repellent, it has sufficient gas permeability. Thus, even when a battery is overcharged, the inner pressure of the battery is unlikely to rise.

Since the separator layer further contains the oxygen-containing metal compound, it can trap the components leached from the negative electrode into the alkaline aqueous solution (alkaline electrolyte) therein. It is therefore possible to relieve the problems caused by the elements that have leached from the negative electrode and reached the positive electrode.

As a result of synergistic effects produced by the above-described constructions of the present invention, the alkaline storage battery of the present invention has a remarkably longer cycle life than conventional batteries.

As the water-absorbing polymer, a polymer having a hydrophilic group in its main chain or side chains can be used without any particular limitation.

The water-absorbing polymer preferably contains at least one kind of monomer unit selected from the group consisting of an acrylate unit and a methacrylate unit as the hydrophilic group. Preferable examples of the acrylate unit include a sodium acrylate unit and a potassium acrylate unit. Preferable examples of the methacrylate unit include a sodium methacrylate unit and a potassium methacrylate unit.

Specifically, for example, alkali metal salts of the following polymers can be used as the water-absorbing polymer. Examples of the salt-forming polymers include polyacrylic acid, polymethacrylic acid, acrylic acid/methacrylic acid copolymer, isobutylene/maleic acid copolymer, poly(2-acrylamide-2-methylpropane sulfonic acid), poly(acryloxypropane sulfonic acid), and poly(vinyl phosphoric acid). Although these polymers have a plurality of acid groups, all the acid groups need not to form alkali metal salts. One kind of water-absorbing polymer may be used alone, or two or more kinds of water-absorbing polymers may be used in combination. Among them, for example, potassium polyacrylate, sodium polyacrylate, potassium polymethacrylate, and sodium polymethacrylate are particularly preferred.

The water-absorbing polymer is preferably a cross-linked polymer. In order to cross-link the water-absorbing polymer, a crosslinking agent such as divinylbenzene may be added in producing a polymer, such as polyacrylic acid, polymethacrylic acid, or acrylic acid/methacrylic acid copolymer. Also, the water-absorbing polymer may be a cross-linked ionomer.

Examples of the water repellent include carbon fluoride and fluorocarbon resin. Typical carbon fluoride is solid at room temperature, with the molar ratio between the fluorine atoms and the carbon atoms contained therein being 1:1. That is, carbon fluoride represented by the formula $CF_x$, wherein $x=1$ is common. However, carbon fluoride represented by the formula $CF_x$, wherein $x<1$ may also be used. Examples of the fluorocarbon resin which may be used include polytetrafluoroethylene, ethylene-tetrafluoroethylene copolymer, polyvinylidene fluoride, and ethylene-chlorotrifluoroethylene copolymer.

The appropriate amount of the water repellent is 0.1 to 100 parts by weight per 100 parts by weight of the water-absorbing polymer. If the amount is less than 0.1 part by weight, the gas permeability of the resultant separator layer lowers, which may result in an increase in battery inner pressure. If the amount is more than 100 parts by weight, the water repellency of the resultant separator layer becomes too high, which may hinder the permeation of the electrolyte.

The water repellent is desirably in powder form. The mean particle size of the water repellent powder is preferably 0.01 to 1 μm.

The oxygen-containing metal compound, serving as the scavenger capable of trapping elements leached from the negative electrode, is preferably at least one selected from the group consisting of a metal oxide and a metal hydroxide. Examples of the metal oxide include zinc oxide, iron oxide, magnesium oxide, manganese oxide, aluminum oxide, chromium oxide, vanadium oxide, titanium oxide, and cobalt oxide. Examples of the metal hydroxide include calcium hydroxide, strontium hydroxide, and magnesium hydroxide.

For example, when the hydrogen storage alloy negative electrode of a nickel-metal hydride storage battery corrodes, Mn, Al, Cu and the like leach therefrom into an electrolyte. These elements are trapped, for example, by oxides or hydroxides, such as zinc oxide, iron oxide, magnesium oxide, manganese oxide, aluminum oxide, chromium oxide, vanadium oxide, titanium oxide, cobalt oxide, and calcium hydroxide, so that they are prevented from moving in the battery.

Likewise, when the zinc negative electrode of a nickel-zinc storage battery releases Zn, Zn is easily trapped by, for example, calcium hydroxide.

It is considered that a trace amount of the oxygen-containing metal compound is dissolved in the form of ions in the electrolyte. These ions may combine with the components leached from the negative electrode, and are trapped in the water-absorbing polymer in the separator layer that holds the electrolyte. As a result, the self-discharge and the deterioration of the positive electrode are suppressed.

Many metal oxides are partially or wholly hydrated in an alkaline aqueous solution to form metal hydroxides. Thus, when the use of an oxide of a metal as the oxygen-containing metal compound is effective in the present invention, a hydroxide of the same metal may be added instead of an oxide of the metal. Particularly, an oxide of a metal which generates a large amount of heat when hydrated, such as calcium oxide, is desirably replaced with a hydroxide of the same metal.

The appropriate amount of the oxygen-containing metal compound is 0.02 to 0.5 part by weight per 100 parts by weight of the water-absorbing polymer. If the amount is less than 0.02 part by weight, the effect of trapping the components leached from the negative electrode may not be sufficient. Also, if the amount is more than 0.5 part by weight, there will be no problem; however, since the solubility of the oxygen-containing metal compound into an electrolyte is limited, the effect of trapping the components leached from the negative electrode is limited. It is up to about 0.5 part by weight that this effect improves in proportion to the amount of the oxygen-containing metal compound.

The mean particle size of the oxygen-containing metal compound is preferably 0.1 to 10 μm.

The separator layer can contain a binder to improve its moldability, durability, and ability to hold the oxygen-containing metal compound. It is preferred to use, as the binder, at least one selected from the group consisting of polyethylene, polypropylene, carboxymethyl cellulose, styrene butadiene rubber and polyvinyl alcohol.

If polyethylene or polypropylene is mixed, while being heated, with a water-absorbing polymer, a water repellent, an alkaline aqueous solution, and an oxygen-containing metal compound and then the mixture is formed into a film, a separator layer having a high mechanical strength can be obtained.

Carboxymethyl cellulose or polyvinyl alcohol is usually added in the form of an aqueous solution to the above-described raw material mixture of a separator layer. After the mixture is formed into a separator layer, these binders also serve as the water-absorbing polymers. Styrene butadiene rubber exerts its binding property when combined with carboxymethyl cellulose or the like, making the separator layer flexible.

The appropriate amount of the binder is 0.01 to 5 parts by weight per 100 parts by weight of the water-absorbing polymer. If the amount is less than 0.01 parts by weight, it may be insufficient for holding the oxygen-containing metal compound. If the amount exceeds 5 parts by weight, the permeability of the electrolyte into the separator layer may degrade.

Polytetrafluoroethylene, which is used as the water repellent, also serves as the binder if a large shearing force is applied when it is mixed with other raw materials of a separator layer to form a mixture.

The water-absorbing polymer may be combined with a core material made of a conventionally-used non-woven fabric, to provide a separator layer. As the material of the non-woven fabric, polyolefin, polyamide, a composite material of polyolefin and polyamide, and the like may be used. The use of such a core material improves the tensile strength of the separator layer, so that the handling of the separator layer becomes easy. For example, the separator layer becomes resistant to breaking when it is wound between the positive electrode and the negative electrode.

When non-woven fabric is used as the separator of an alkaline storage battery, the non-woven fabric usually needs to be subjected to a hydrophilic treatment or the like, in order to enhance its ability to hold the electrolyte. However, when non-woven fabric is impregnated with a water-absorbing polymer to be used as a separator layer, there is no need to apply a hydrophilic treatment to the non-woven fabric, since the water-absorbing polymer is hydrophilic. Therefore, the present invention needs no hydrophilic treatment even when non-woven fabric is used as the core material of the separator layer, so that the manufacturing cost of batteries can be reduced accordingly.

The thickness of the separator layer is preferably 20 to 200 µm. If the separator layer is too thin, the strength of the separator layer lowers, which may result in problems such as internal short-circuits of batteries. On the other hand, if the thickness exceeds 200 µm, it is difficult to reduce battery size, the air permeability of the separator layer decreases, and the internal resistance of the battery increases. However, since the thickness of the separator layer depends on the size and design of the battery, the thickness is not limited to the above-mentioned range. It is noted that when a core material of non-woven fabric is used, the thickness of the core material is preferably 10 to 200 µm.

The separator layer according to the present invention can be obtained, for example, as follows.

First, a mixture of a water-absorbing polymer, a water repellent, an alkaline aqueous solution, and an oxygen-containing metal compound (hereinafter referred to as the raw material mixture of the separator layer) is prepared. For example, the above-described raw materials are mixed using a mixing device, such as a mixer or a kneader, to obtain a raw material mixture of the separator layer. In preparing a mixture, the raw materials may be mixed in no particular order; however, if the water repellent is sufficiently mixed with water before adding the other raw materials, the dispersibility of the resultant raw material mixture improves.

Methods of forming a separator layer from the raw material mixture of the separator layer are roughly classified into two methods.

According to one method, the raw material mixture of a separator layer is formed into a sheet, to prepare a polymer sheet that serves as the separator layer. It is also possible to prepare a polymer sheet with a core material by applying the raw material mixture onto non-woven fabric or impregnating non-woven fabric with the raw material mixture.

Subsequently, the positive electrode and the negative electrode are layered with the separator layer interposed therebetween, and the resultant is wound if necessary, to form an electrode group. In forming the electrode group, an additional device is necessary for feeding the polymer sheet, in addition to the devices for feeding the positive electrode and the negative electrode.

According to the other method, the raw material mixture of a separator layer is applied onto at least one of a surface of the positive electrode and a surface of the negative electrode, to form the separator layer bonded to the surface thereof. In this case, non-woven fabric impregnated with the raw material mixture may be bonded to the electrode surface. Also, the raw material mixture may be applied onto the electrode surface, and non-woven fabric may then be placed thereon. Alternatively, non-woven fabric may be placed on the electrode surface, and the raw material mixture may then be applied thereon.

Also, the separator layer may be formed on only the surface of the positive electrode, or it may be formed on only the surface of the negative electrode. Alternatively, the separator layer may be formed on both the surface of the positive electrode and the surface of the negative electrode. Also, the separator layer may be formed on only one side of each electrode, or may be formed on both sides. However, care should be taken to see that the separator layer intervenes at least between the positive electrode and the negative electrode.

Subsequently, the positive electrode and the negative electrode are layered with the separator layer interposed therebetween, and the resultant is wound if necessary, to form an electrode group. In this case, since the separator layer is integrated with the electrode, no device is necessary for feeding the polymer sheet in forming the electrode group. That is, there is no need to layer or wind the three members, i.e., the positive electrode, the negative electrode and the separator, for example. Only the negative electrode integrated with the separator layer and the positive electrode may be layered or wound. Thus, winding deviation, layering deviation and the like are unlikely to occur.

Figure 1:
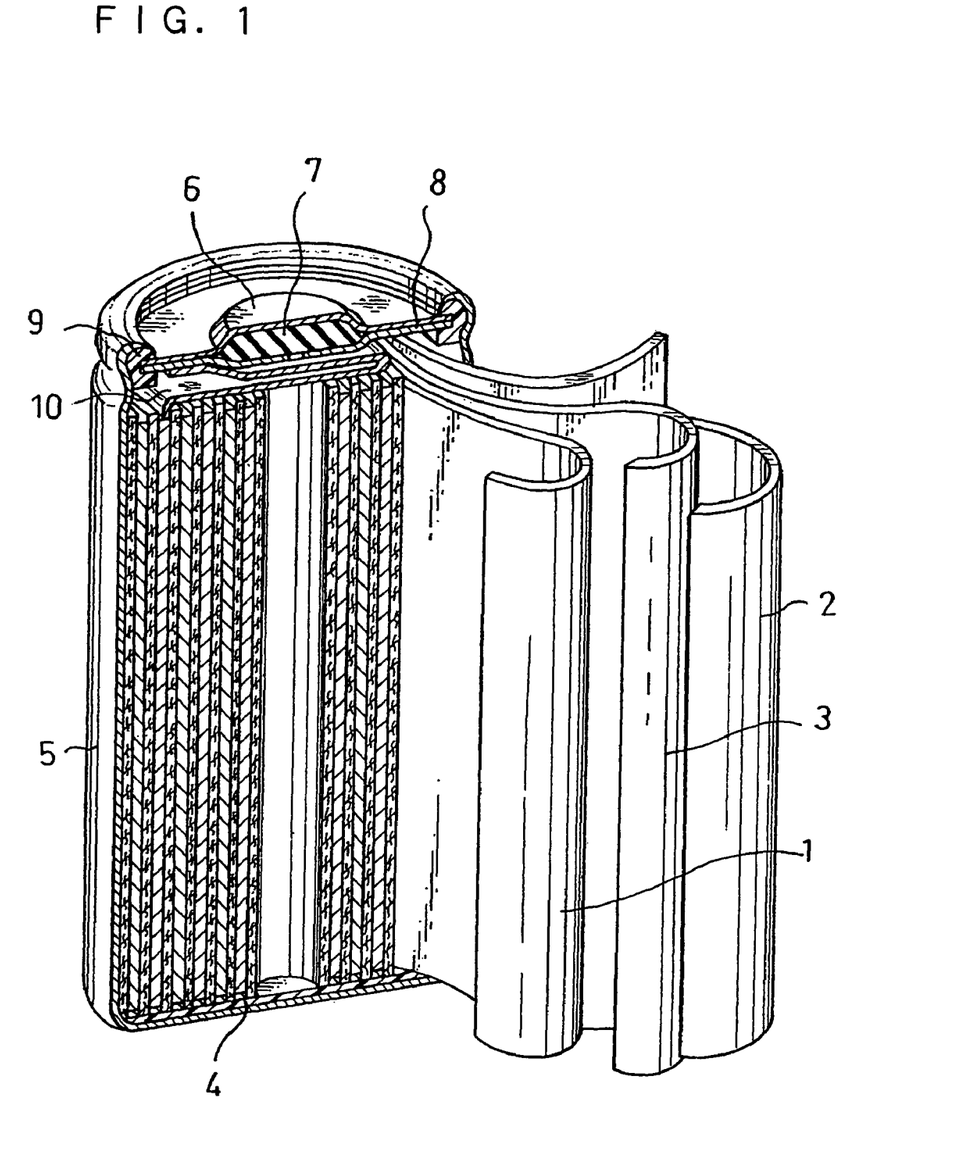
FIG. 1 is a partially extended, sectional perspective view of a sealed nickel-metal hydride storage battery which is an exemplary alkaline storage battery according to the present invention.

Referring now to FIG. 1, an example of the method for producing an alkaline storage battery according to the present invention is described.

FIG. 1 is a partially extended, sectional perspective view of an exemplary cylindrical nickel-metal hydride storage battery. In FIG. 1, a positive electrode 1 containing nickel hydroxide, a negative electrode 2 containing a hydrogen storage alloy, and a separator layer 3 in the form of a sheet constitute an electrode group.

The positive electrode 1 is produced by causing a current collector, such as metal foil or expanded metal, to carry a positive electrode material mixture, and is usually in the form of a band or strip immediately after the production.

The negative electrode 2 is produced by causing a current collector, such as metal foil or expanded metal, to carry a negative electrode material mixture, and is usually in the form of a band or strip immediately after the production.

The positive electrode 1 and the negative electrode 2 can be produced by conventional methods.

The separator layer 3 comprises a water-absorbing polymer, a water repellent, an alkaline aqueous solution, and an oxygen-containing metal compound. It may have a core material comprising non-woven fabric, as described above.

In order to form the separator layer 3, a raw material mixture of a water-absorbing polymer, a water repellent, an oxide and an alkaline aqueous solution is first prepared as described above. If necessary, an appropriate binder is added thereto.

The appropriate amounts of the water repellent and the binder are 1 to 8 parts by weight and 0.1 to 2 parts by weight, respectively, per 100 parts by weight of the total of the water-absorbing polymer and the alkaline aqueous solution. If the amount of the water repellent is too small, the gas permeability of the resultant separator layer lowers, so that sufficient effects of the present invention cannot be obtained. On the other hand, if the amount of the water repellent is too large, the internal resistance of the resultant battery may increase.

The amount of the alkaline aqueous solution may be appropriately selected, depending on the kind of the water-absorbing polymer. Also, the specific gravity of the alkaline aqueous solution is preferably 1.1 to 1.4 g/ml.

In forming the raw material mixture of the separator layer into a sheet, the raw material mixture is applied onto a flat surface of a substrate, such as a glass plate, in a given thickness, and is appropriately dried for gelling. The resultant gel is peeled from the substrate, to obtain a polymer sheet that serves as the separator layer. Alternatively, the raw material mixture of the separator layer is impregnated into or applied onto non-woven fabric and dried appropriately, to obtain a polymer sheet with a core material of the non-woven fabric.

Next, the positive electrode 1, and the negative electrode 2, and the resultant separator layer 3 comprising the polymer sheet are assembled into a nickel-metal hydride storage battery by a conventional method. First, the positive electrode 1 and the negative electrode 2 are layered with the separator layer 3 interposed therebetween, and then wound to form an electrode group. The electrode group is placed in a battery container 5 with an insulator plate 4 on its bottom. Thereafter, an alkaline electrolyte is injected into the battery container 5.

The opening of the battery container 5 is sealed with a sealing member 8. The sealing member 8 has a positive electrode terminal 6 and a safety valve 7. The safety valve 7 is configured such that a vent hole, communicating with the inside and outside of the battery container, is closed with a rubber valve. The circumference of the sealing member 8 is fitted with an insulating gasket 9. Thus, when the battery is sealed, the positive electrode terminal is insulated from the negative electrode terminal. In the event of gas generation inside the battery, the inner pressure increases, thereby deforming the rubber valve and allowing the gas to be released from the vent hole.

One end of a positive electrode lead 10 is connected to the positive electrode, which is a constituent member of the electrode group. The other end of the positive electrode lead 10 is connected to the sealing member 8 with the positive electrode terminal 6. Part of the negative electrode which is located at the outermost part of the wound electrode group is in contact with the inner face of the battery container 5 made of metal. Since the outer face of the battery container 5 is coated with an insulating material except the bottom, the outer face of the bottom serves as the negative electrode terminal.

The structure of the alkaline storage battery of the present invention is not limited to that as shown in FIG. 1. For example, the present invention is applicable to not only cylindrical batteries but also batteries of other shapes, such as rectangular and coin shapes. Also, the present invention is applicable to not only batteries including a wound electrode group but also batteries including a layered electrode group. Further, the battery container, sealing member and other elements are not limited to those as shown in FIG. 1, and conventional elements can be used in combination without any particular limitation.

The present invention will be specifically described below by way of examples.

EXAMPLE 1

(i) Positive Electrode Preparation

A carbonyl nickel powder (#255, manufactured by Inco Limited.) was dispersed in an aqueous solution containing 1% by weight of methyl cellulose, to form a slurry with a solid content of 35% by weight. The slurry was applied onto a surface of a metal substrate such that the weight density of the nickel powder after sintering would become 50 g/m². The metal substrate was a nickel foil with a thickness of 20 μm and a weight density of 170 g/m², produced by electrolytic plating.

Subsequently, the nickel foil with the slurry was dried to evaporate its water content, and was then sintered in a hydrogen reducing atmosphere containing steam at 950° C. for 15 minutes. As a result, the organic matter contained in the slurry was removed, so that a sintered body of nickel foil and nickel powder (hereinafter referred to as a "sintered nickel substrate") was obtained.

The sintered nickel substrate was cut in matrix form to make 2-mm-long slits at pitches of 0.5 mm, and the rectangular parts of the sintered nickel substrate between the slits were alternately protruded upward and downward. In this way, the sintered nickel substrate was worked into a three-dimensional shape with an apparent thickness of 200 μm.

Thereafter, a nickel hydroxide solid solution containing Co and Zn was produced as a positive electrode active material. The nickel hydroxide was caused to carry cobalt hydroxide on its surface. The amount of the cobalt hydroxide carried on the surface of the nickel hydroxide was 7 parts by weight per 100 parts by weight of the nickel hydroxide.

The nickel hydroxide with the cobalt hydroxide carried thereon was subjected to an oxidization treatment in the presence of an alkaline aqueous solution. After the oxidization treatment, 100 parts by weight of the resultant powder was mixed with a suitable amount of water and 0.1 part by weight of a binder (polytetrafluoroethylene), to form a positive electrode material mixture slurry. The positive electrode material mixture slurry was filled into the three-dimensionally-worked sintered nickel substrate with an apparent thickness of 200 μm.

The sintered nickel substrate with the positive electrode material mixture slurry was dried, rolled, and cut into a predetermined size, to obtain a positive electrode. The positive electrode was 160 μm in thickness, 50 mm in width, and 1600 mm in length.

(ii) Negative Electrode Preparation

A hydrogen storage alloy electrode was prepared. A known $AB_5$ type alloy was used as a hydrogen storage alloy. This alloy was pulverized into a mean particle size of 24 μm and then treated with alkali. After the alkali treatment, 100 parts by weight of the alloy powder was mixed with a suitable amount of water and 1 part by weight of a binder (styrene butadiene rubber), to form a negative electrode material mixture paste. The negative electrode material mixture paste was applied onto a nickel-plated punched metal substrate.

The punched metal substrate with the negative electrode material mixture paste was dried, rolled, and cut into a predetermined size, to obtain a negative electrode. The negative electrode was 110 μm in thickness, 50 mm in width, and 1670 mm in length.

(iii) Separator Layer (Polymer Sheet) Preparation 10 g of cross-linked potassium polyacrylate (water-absorbing polymer) was mixed with 125 g of an aqueous potassium hydroxide solution with a concentration of 6 mol/L (alkaline aqueous solution), 0.2 g of carboxymethyl cellulose (binder), 6.75 g of polytetrafluoroethylene powder with a mean particle size (median diameter $D_{50}$) of 0.1 μm (water repellent), and 0.5 g of a predetermined oxide with a mean particle size (median diameter $D_{50}$) of 1 μm (oxygen-containing metal compound) to form a gel.

The gel was applied onto a flat surface of a glass plate, dried, and then peeled from the glass plate. The film thus obtained was rolled to a thickness of 80 μm and cut into a predetermined size, to obtain a polymer sheet.

The air permeability of the polymer sheet was 18 ml/cm²·s at a pressure difference of 124 Pa.

As the above-mentioned oxide, zinc oxide, iron oxide, magnesium oxide, manganese oxide, aluminum oxide, chromium oxide, vanadium oxide, titanium oxide and cobalt oxide were used.

(iv) Battery Production

The positive electrode and the negative electrode were layered with the polymer sheet between them, and then wound to form an electrode group. In the upper part of the electrode group, a positive electrode current collector plate was welded to the exposed part of the sintered nickel substrate of the positive electrode. Also, in the lower part of the electrode group, a negative electrode current collector plate was welded to the exposed part of the punched metal substrate of the negative electrode. Thereafter, the electrode group was placed into a D-size battery container, and the central part of the negative electrode current collector plate was spot-welded to the bottom of the battery container.

Subsequently, an aqueous potassium hydroxide solution with a specific gravity of 1.3 g/ml was injected as the electrolyte into the battery container. An upper insulator plate was mounted on top of the electrode group, and the opening of the battery container was sealed with a sealing plate whose circumference was fitted with a gasket. The sealing plate was equipped with a safety valve and a positive electrode terminal. It is noted that before the sealing, the positive electrode current collector plate was electrically connected with a positive electrode cap of the sealing plate. In this way, a sealed battery with a nominal capacity of 6000 mAh in the initial state was completed.

Batteries made with zinc oxide, iron oxide, magnesium oxide, manganese oxide, aluminum oxide, chromium oxide, vanadium oxide, titanium oxide, and cobalt oxide as the oxygen-containing metal compound were named Example batteries A-1, A-2, A-3, A-4, A-5, A-6, A-7, A-8, and A-9, respectively.

Also, for comparison, a battery was produced in the same manner as the Example batteries except that a polymer sheet contained no oxide. This battery was named Comparative example battery A-10.

(v) Battery Evaluation

The Example batteries A-1 to A-9 with the nominal capacity of 6000 mAh in the initial state were repeatedly charged and discharged at an atmospheric temperature of 40° C., and the self-discharge characteristics were compared between the initial state and after 15000 cycles.

In the charge and discharge, the charge current and the discharge current were 50 A. The batteries were charged until their capacities became 60% SOC (State of Charge), and discharged until their capacities became 40% SOC.

The self-discharge characteristics were measured as follows. The batteries in the initial state and after 15000 cycles were charged at 25° C. until a charging state of 80%, which corresponds to 4.8 Ah of the battery capacity. The batteries were then stored at 45° C. for 10 days. Thereafter, the batteries were allowed to cool to a temperature of 25° C. and then discharged at a current of 2 A until the battery voltage dropped to 1.0 V. The ratio of the discharge capacity obtained at that time to 4.8 Ah was defined as the remaining capacity rate.

It is noted that 9 batteries were produced for each of the Example batteries A-1 to A-9, and that the average value of the remaining capacity rates of the 9 batteries was found.

COMPARATIVE EXAMPLE 1

(i) Battery Production

A sealed battery with a nominal capacity of 6000 mAh in the initial state was produced in the same manner as in Example 1, except for the use of a 80-μm-thick polypropylene non-woven fabric subjected to hydrophilic treatment, instead of the polymer sheet obtained in Example 1. This battery was named battery B.

(ii) Battery Evaluation

Battery B was evaluated in the same manner as in Example 1.

Table 1 shows the evaluation results of the batteries of Example 1 and Comparative Example 1.

TABLE 1

| Battery | Oxide | Remaining capacity rate (%) | |
|---|---|---|---|
| | | Initial state | After 15000 cycles |
| A-1 | Zinc oxide | 92.2 | 89.3 |
| A-2 | Iron oxide | 92.2 | 88.5 |
| A-3 | Magnesium oxide | 92.2 | 89.5 |
| A-4 | Manganese oxide | 92.0 | 87.5 |
| A-5 | Aluminum oxide | 92.0 | 88.2 |
| A-6 | Chromium oxide | 92.1 | 89.0 |
| A-7 | Vanadium oxide | 92.0 | 89.2 |
| A-8 | Titanium oxide | 92.2 | 89.5 |
| A-9 | Cobalt oxide | 92.0 | 89.5 |
| A-10 | None | 92.2 | 86.9 |
| B | None | 91.0 | 72.9 |

EXAMPLE 2

(i) Battery Production

A sealed battery with a nominal capacity of 6000 mAh in the initial state was produced in the same manner as in Example 1, except for the use of carbon fluoride ($CF_{1.0}$) with a mean particle size (median diameter $D_{50}$) of 0.2 μm, instead of polytetrafluoroethylene, in the preparation of a separator layer.

Batteries made with zinc oxide, iron oxide, magnesium oxide, manganese oxide, aluminum oxide, chromium oxide, vanadium oxide, titanium oxide, and cobalt oxide as the oxygen-containing metal compound were named Example batteries C-1, C-2, C-3, C-4, C-5, C-6, C-7, C-8 and C-9, respectively.

(ii) Battery Evaluation

The batteries C-1 to C-9 were evaluated in the same manner as in Example 1. Table 2 shows the results.

TABLE 2

| Battery | Oxide | Remaining capacity rate (%) | |
|---|---|---|---|
| | | Initial state | After 15000 cycles |
| C-1 | Zinc oxide | 92.3 | 89.3 |
| C-2 | Iron oxide | 92.4 | 88.6 |
| C-3 | Magnesium oxide | 92.1 | 89.3 |
| C-4 | Manganese oxide | 92.2 | 87.7 |
| C-5 | Aluminum oxide | 92.3 | 88.3 |
| C-6 | Chromium oxide | 92.1 | 89.3 |
| C-7 | Vanadium oxide | 92.2 | 89.5 |
| C-8 | Titanium oxide | 92.3 | 89.4 |
| C-9 | Cobalt oxide | 92.1 | 89.6 |

EXAMPLE 3

(i) Separator Layer (Polymer Sheet) Preparation 10 g of cross-linked potassium polyacrylate (water-absorbing polymer) was mixed with 125 g of an aqueous potassium hydroxide solution with a specific gravity of 1.25 g/ml (alkaline aqueous solution), 0.2 g of carboxymethyl cellulose (binder), 6.75 g of polytetrafluoroethylene powder with a mean particle size (median diameter $D_{50}$) of 0.1 μm (water repellent), and 0.5 g of a predetermined oxide with a mean particle size (median diameter $D_{50}$) of 1 μm (oxygen-containing metal compound) to form a gel.

The gel was impregnated into a polypropylene non-woven fabric used in Comparative Example 1, and then dried. In this way, a polymer sheet with a thickness of 80 μm was obtained.

The air permeability of the resultant polymer sheet was approximately 18 ml/cm$^2$·s at a pressure difference of 124 Pa.

(ii) Battery Production

A sealed battery with a nominal capacity of 6000 mAh in the initial state was produced in the same manner as in Example 1, except for the use of the polymer sheet thus obtained.

Batteries made with zinc oxide, iron oxide, magnesium oxide, manganese oxide, aluminum oxide, chromium oxide, vanadium oxide, titanium oxide, and cobalt oxide as the oxygen-containing metal compound were named Example batteries D-1, D-2, D-3, D-4, D-5, D-6, D-7, D-8 and D-9, respectively.

(iii) Battery Evaluation

Batteries D-1 to D-9 were evaluated in the same manner as in Example 1. Table 3 shows the results.

TABLE 3

| Battery | Oxide | Remaining capacity rate (%) | |
|---|---|---|---|
| | | Initial state | After 15000 cycles |
| D-1 | Zinc oxide | 92.4 | 89.5 |
| D-2 | Iron oxide | 92.5 | 88.6 |
| D-3 | Magnesium oxide | 92.2 | 89.8 |
| D-4 | Manganese oxide | 92.2 | 87.8 |
| D-5 | Aluminum oxide | 92.1 | 88.1 |
| D-6 | Chromium oxide | 92.2 | 89.1 |
| D-7 | Vanadium oxide | 92.2 | 89.5 |
| D-8 | Titanium oxide | 92.3 | 89.4 |
| D-9 | Cobalt oxide | 92.1 | 89.6 |

EXAMPLE 4

(i) Separator Layer Preparation 10 g of cross-linked potassium polyacrylate (water-absorbing polymer) was mixed with 125 g of an aqueous potassium hydroxide solution with a specific gravity of 1.25 g/ml (alkaline aqueous solution), 0.2 g of carboxymethyl cellulose (binder), 6.75 g of polytetrafluoroethylene powder with a mean particle size (median diameter $D_{50}$) of 0.1 μm (water repellent), and 0.5 g of a predetermined oxide with a mean particle size (median diameter $D_{50}$) of 1 μm (oxygen-containing metal compound) to form a gel.

The gel was applied to both sides of the negative electrode and appropriately dried, to form a separator layer. The negative electrode integrated with the separator layer and the positive electrode were layered and then pressed lightly by a pressure of approximately 0.1 kgf/cm$^2$. The thickness of the separator layer between the electrode plates was measured and turned out to be approximately 80 μm.

(ii) Battery Production

A sealed battery with a nominal capacity of 6000 mAh in the initial state was produced in the same manner as in Example 1, except that an electrode group was prepared by layering the positive electrode and the negative electrode integrated with the above-described separator layer and winding them, without using the polymer sheet.

Batteries made with zinc oxide, iron oxide, magnesium oxide, manganese oxide, aluminum oxide, chromium oxide, vanadium oxide, titanium oxide, and cobalt oxide as the oxygen-containing metal compound were named Example batteries E-1, E-2, E-3, E-4, E-5, E-6, E-7, E-8 and E-9, respectively.

(iii) Battery Evaluation

The batteries E-1 to E-9 were evaluated in the same manner as in Example 1. Table 4 shows the results.

TABLE 4

| Battery | Oxide | Remaining capacity rate (%) | |
|---|---|---|---|
| | | Initial state | After 15000 cycles |
| E-1 | Zinc oxide | 92.4 | 89.4 |
| E-2 | Iron oxide | 92.2 | 88.6 |
| E-3 | Magnesium oxide | 92.4 | 89.5 |
| E-4 | Manganese oxide | 92.1 | 87.8 |
| E-5 | Aluminum oxide | 91.9 | 88.1 |
| E-6 | Chromium oxide | 92.1 | 89.0 |
| E-7 | Vanadium oxide | 92.1 | 89.1 |
| E-8 | Titanium oxide | 92.4 | 89.7 |
| E-9 | Cobalt oxide | 92.1 | 89.5 |

EXAMPLE 5

(i) Separator Layer Preparation 10 g of cross-linked potassium polyacrylate (water-absorbing polymer) was mixed with 125 g of an aqueous potassium hydroxide solution with a specific gravity of 1.25 g/ml (alkaline aqueous solution), 0.2 g of carboxymethyl cellulose (binder), 6.75 g of polytetrafluoroethylene powder with a mean particle size (median diameter $D_{50}$) of 0.1 μm (water repellent), and 0.5 g of a predetermined oxide with a mean particle size (median diameter $D_{50}$) of 1 μm (oxygen-containing metal compound) to form a gel.

The gel was applied to both sides of the positive electrode and appropriately dried, to form a separator layer. The positive electrode integrated with the separator layer and the negative electrode were layered. The thickness of the separator layer between the electrode plates was measured and turned out to be approximately 80 μm.

(ii) Battery Production

A sealed battery with a nominal capacity of 6000 mAh in the initial state was produced in the same manner as in Example 1, except that an electrode group was prepared by layering the negative electrode and the positive electrode integrated with the above-described separator layer and winding them, without using the polymer sheet.

Batteries made with zinc oxide, iron oxide, magnesium oxide, manganese oxide, aluminum oxide, chromium oxide, vanadium oxide, titanium oxide, and cobalt oxide as the oxygen-containing metal compound were named Example batteries F-1, F-2, F-3, F-4, F-5, F-6, F-7, F-8, and F-9, respectively.

(iii) Battery Evaluation

Batteries F-1 to F-9 were evaluated in the same manner as in Example 1. Table 5 shows the results.

TABLE 5

| Battery | Oxide | Remaining capacity rate (%) | |
|---|---|---|---|
| | | Initial state | After 15000 cycles |
| F-1 | Zinc oxide | 92.3 | 89.2 |
| F-2 | Iron oxide | 92.2 | 88.7 |
| F-3 | Magnesium oxide | 92.3 | 89.5 |
| F-4 | Manganese oxide | 92.2 | 87.5 |
| F-5 | Aluminum oxide | 92.1 | 88.5 |
| F-6 | Chromium oxide | 92.0 | 88.9 |
| F-7 | Vanadium oxide | 92.1 | 89.2 |

TABLE 5-continued

| Battery | Oxide | Remaining capacity rate (%) | |
|---|---|---|---|
| | | Initial state | After 15000 cycles |
| F-8 | Titanium oxide | 92.4 | 89.6 |
| F-9 | Cobalt oxide | 92.0 | 89.6 |

EXAMPLE 6

(i) Separator Layer Preparation 10 g of cross-linked potassium polyacrylate (water-absorbing polymer) was mixed with 125 g of an aqueous potassium hydroxide solution with a specific gravity of 1.25 g/ml (alkaline aqueous solution), 0.2 g of carboxymethyl cellulose (binder), 6.75 g of polytetrafluoroethylene powder with a mean particle size (median diameter $D_{50}$) of 0.1 μm (water repellent), and 0.5 g of a predetermined oxide with a mean particle size (median diameter $D_{50}$) of 1 μm (oxygen-containing metal compound) to form a gel.

The gel was applied onto both sides of the negative electrode in a thickness of 10 μm and appropriately dried, to form a separator layer.

(ii) Battery Production

A sealed battery with a nominal capacity of 6000 mAh in the initial state was produced in the same manner as in Example 1, except that an electrode group was prepared by layering the positive electrode and the negative electrode integrated with the above-described separator layer, with a 70-μm-thick polypropylene non-woven fabric interposed therebetween, and winding them, without using the polymer sheet.

Batteries made with zinc oxide, iron oxide, magnesium oxide, manganese oxide, aluminum oxide, chromium oxide, vanadium oxide, titanium oxide, and cobalt oxide as the oxygen-containing metal compound were named Example batteries G-1, G-2, G-3, G-4, G-5, G-6, G-7, G-8, and G-9, respectively.

(iii) Battery Evaluation

Batteries G-1 to G-9 were evaluated in the same manner as in Example 1. Table 6 shows the results.

TABLE 6

| Battery | Oxide | Remaining capacity rate (%) | |
|---|---|---|---|
| | | Initial state | After 15000 cycles |
| G-1 | Zinc oxide | 92.1 | 89.2 |
| G-2 | Iron oxide | 92.3 | 88.5 |
| G-3 | Magnesium oxide | 92.4 | 89.4 |
| G-4 | Manganese oxide | 91.7 | 87.5 |
| G-5 | Aluminum oxide | 92.1 | 88.3 |
| G-6 | Chromium oxide | 92.3 | 88.9 |
| G-7 | Vanadium oxide | 91.8 | 89.1 |
| G-8 | Titanium oxide | 92.4 | 89.7 |
| G-9 | Cobalt oxide | 92.1 | 89.5 |

EXAMPLE 7

(i) Separator Layer Preparation 10 g of cross-linked potassium polyacrylate (water-absorbing polymer) was mixed with 125 g of an aqueous potassium hydroxide solution with a specific gravity of 1.25 g/ml (alkaline aqueous solution), 0.2 g of carboxymethyl cellulose (binder), 6.75 g of polytetrafluoroethylene powder with a mean particle size (median diameter $D_{50}$) of 0.1 μm (water repellent), and 0.5 g of a predetermined oxide with a mean particle size (median diameter $D_{50}$) of 1 μm (oxygen-containing metal compound) to form a gel.

The gel was applied onto both sides of the positive electrode in a thickness of 10 μm and appropriately dried, to form a separator layer.

(ii) Battery Production

A sealed battery with a nominal capacity of 6000 mAh in the initial state was produced in the same manner as in Example 1, except that an electrode group was prepared by layering the negative electrode and the positive electrode integrated with the above-described separator layer, with a 70-μm-thick polypropylene non-woven fabric interposed therebetween, and winding them, without using the polymer sheet.

Batteries made with zinc oxide, iron oxide, magnesium oxide, manganese oxide, aluminum oxide, chromium oxide, vanadium oxide, titanium oxide, and cobalt oxide as the oxygen-containing metal compound were named Example batteries H-1, H-2, H-3, H-4, H-5, H-6, H-7, H-8, and H-9, respectively.

(iii) Battery Evaluation

Batteries H-1 to H-9 were evaluated in the same manner as in Example 1. Table 7 shows the results.

TABLE 7

| Battery | Oxide | Remaining capacity rate (%) | |
|---|---|---|---|
| | | Initial state | After 15000 cycles |
| H-1 | Zinc oxide | 92.1 | 89.5 |
| H-2 | Iron oxide | 92.3 | 88.6 |
| H-3 | Magnesium oxide | 92.4 | 89.7 |
| H-4 | Manganese oxide | 91.8 | 87.6 |
| H-5 | Aluminum oxide | 92.0 | 88.3 |
| H-6 | Chromium oxide | 92.2 | 88.9 |
| H-7 | Vanadium oxide | 92.1 | 89.2 |
| H-8 | Titanium oxide | 92.4 | 89.6 |
| H-9 | Cobalt oxide | 92.1 | 89.7 |

EXAMPLE 8

(i) Positive Electrode Preparation

A carbonyl nickel powder (mean particle size: 0.2 μm) was dispersed in an aqueous solution containing 0.3% by weight of methyl cellulose, to form a slurry with a solid content of 60% by weight. The slurry was applied onto a surface of a metal substrate. The metal substrate used was a 60-μm-thick punched metal.

Subsequently, the punched metal with the slurry was dried to evaporate its water content, and was then sintered in a reducing atmosphere at 800 to 900° C. As a result, a sintered body with a thickness of approximately 0.3 mm and a porosity of approximately 87% (hereinafter referred to as a "porous nickel substrate") was obtained.

The porous nickel substrate thus obtained was immersed in an aqueous nickel nitrate solution with a concentration of 6 mol/L whose temperature was adjusted to 80° C. The substrate was then taken out of the aqueous solution and dried with hot air. Subsequently, the dried substrate was immersed in an aqueous sodium hydroxide solution with a concentration of 10 mol/L. The substrate was then taken out of the alkaline aqueous solution, washed with pure water, and dried with hot air. A series of these operations was repeated 6 times, whereby the active material of nickel hydroxide was filled in the porous nickel substrate.

Thereafter, the nickel hydroxide filed in the substrate was activated, and the nickel hydroxide was charged and discharged in an electrolyte to remove impurities. After the charge and discharge, the substrate with the nickel hydroxide filled therein was washed with pure water, dried with hot air, and cut into a width of 50 mm and a length of 930 mm, to obtain a positive electrode.

(ii) Negative Electrode Preparation

A hydrogen storage alloy electrode was prepared. A known $AB_5$ type alloy was used as a hydrogen storage alloy. This alloy was pulverized into a mean particle size of 20 μm and then treated with alkali. After the alkali treatment, 100 parts by weight of the alloy powder was mixed with a suitable amount of water and 1 part by weight of a binder (styrene butadiene rubber), to form a negative electrode material mixture paste. The negative electrode material mixture paste was applied onto a nickel-plated punched metal substrate.

The punched metal substrate with the negative electrode material mixture paste was dried, rolled, and cut into a predetermined size, to obtain a negative electrode. The negative electrode was 150 μm in thickness, 50 mm in width, and 1000 mm in length.

(iii) Separator Layer (Polymer Sheet) Preparation 10 g of cross-linked potassium polyacrylate (water-absorbing polymer) was mixed with 125 g of an aqueous potassium hydroxide solution with a concentration of 6 mol/L (alkaline aqueous solution), 0.2 g of carboxymethyl cellulose (binder), 6.75 g of polytetrafluoroethylene powder with a mean particle size (median diameter $D_{50}$) of 0.1 μm (water repellent), and 0.03 g of a predetermined oxide with a mean particle size (median diameter $D_{50}$) of 1 μm (oxygen-containing metal compound) to form a gel.

The gel was applied onto a flat surface of a glass plate, dried, and then peeled from the glass plate. The film thus obtained was rolled to a thickness of 150 μm and cut into a predetermined size, to obtain a polymer sheet.

The air permeability of the polymer sheet was 13 ml/cm$^2$·s at a pressure difference of 124 Pa.

As the above-mentioned oxide, zinc oxide, iron oxide, magnesium oxide, manganese oxide, aluminum oxide, chromium oxide, vanadium oxide, titanium oxide and cobalt oxide were used.

(iv) Battery Production

A sealed battery with a nominal capacity of 6000 mAh in the initial state was produced in the same manner as in Example 1, except for the use of the above-described positive electrode, negative electrode and polymer sheet.

Batteries made with zinc oxide, iron oxide, magnesium oxide, manganese oxide, aluminum oxide, chromium oxide, vanadium oxide, titanium oxide, and cobalt oxide as the oxygen-containing metal compound were named Example batteries I-1, I-2, I-3, I-4, I-5, I-6, I-7, I-8, and I-9, respectively.

(v) Battery Evaluation

Batteries I-1 to I-9 were evaluated in the same manner as in Example 1. As a result, the remaining capacity of the batteries after 15000 charge and discharge cycles was around 4.3±0.05 Ah after the self-discharge during a 10-day storage at 45° C. On the other hand, the remaining capacity of the battery B using the conventional separator after the self-discharge was approximately 3.5 Ah. This indicates that the remaining capacity of the batteries of the present invention is greatly improved, in comparison with that of the conventional battery.

EXAMPLE 9

(i) Negative Electrode Preparation

A hydrogen storage alloy electrode was prepared. A known $AB_5$ type alloy was used as a hydrogen storage alloy. This alloy was pulverized into a mean particle size of 20 μm and then treated with alkali.

The core material of the negative electrode used was a three-dimensionally-worked sintered nickel substrate (apparent thickness: 200 μm) that was used as the core material of the positive electrode in Example 1.

The sintered nickel substrate was passed through a pair of rolls, while hydrogen storage alloy powder was being supplied to the surfaces of the substrate. As a result, the substrate and the hydrogen storage alloy powder were heat-rolled at the same time, so that the hydrogen storage alloy powder was fixed, in a sintered state, to both sides of the substrate.

The substrate with the hydrogen storage alloy powder fixed thereto was rolled and cut into a predetermined size, to obtain a negative electrode. The negative electrode was 110 μm in thickness, 50 mm in width, and 1670 mm in length.

(ii) Battery Production

A sealed battery with a nominal capacity of 6000 mAh in the initial state was produced in the same manner as in Example 1, except for the use of the negative electrode thus produced.

Batteries made with zinc oxide, iron oxide, magnesium oxide, manganese oxide, aluminum oxide, chromium oxide, vanadium oxide, titanium oxide, and cobalt oxide as the oxygen-containing metal compound were named Example batteries J-1, J-2, J-3, J-4, J-5, J-6, J-7, J-8, and J-9, respectively.

(iii) Battery Evaluation

Batteries J-1 to J-9 were evaluated in the same manner as in Example 1. Table 8 shows the results.

TABLE 8

| | | Remaining capacity rate (%) | |
| --- | --- | --- | --- |
| Battery | Oxide | Initial state | After 15000 cycles |
| J-1 | Zinc oxide | 92.4 | 89.3 |
| J-2 | Iron oxide | 92.1 | 88.6 |
| J-3 | Magnesium oxide | 92.2 | 89.6 |
| J-4 | Manganese oxide | 92.1 | 87.8 |
| J-5 | Aluminum oxide | 92.3 | 88.3 |
| J-6 | Chromium oxide | 92.2 | 89.1 |
| J-7 | Vanadium oxide | 91.9 | 89.4 |
| J-8 | Titanium oxide | 92.2 | 89.6 |
| J-9 | Cobalt oxide | 92.1 | 89.7 |

EXAMPLE 10

In this Example, a nickel-zinc storage battery was produced.

(i) Positive Electrode Preparation

A positive electrode was produced in the same manner as in Example 1 except for the following changes. The thickness of the positive electrode after the rolling was changed to 600 μm by changing the amount of the positive electrode material mixture paste applied to the three-dimensionally-worked sintered nickel substrate with an apparent thickness of 200 µm. Also, the width was changed to 42 mm, and the length to 80 mm.

(ii) Negative Electrode Preparation

A zinc electrode was produced. Zinc oxide powder, zinc powder, calcium hydroxide powder, and polyvinyl alcohol were mixed in a weight ratio of 10:3:0.6:0.3. This mixture was then mixed with a suitable amount of water, to form a negative electrode material mixture paste. The negative electrode material mixture paste was applied onto a 80-µm-thick punched metal substrate made of brass.

The punched metal substrate with the negative electrode material mixture paste was dried, rolled, and cut into a predetermined size, to obtain a negative electrode. The negative electrode was 400 µm in thickness, 42 mm in width, and 110 mm in length.

(iii) Separator Layer (Polymer Sheet) Preparation 10 g of cross-linked potassium polyacrylate (water-absorbing polymer) was mixed with 125 g of an aqueous potassium hydroxide solution with a concentration of 6 mol/L (alkaline aqueous solution), 0.2 g of polyvinyl alcohol (binder), 6.75 g of polytetrafluoroethylene powder with a mean particle size (median diameter $D_{50}$) of 0.1 µm (water repellent), and 0.5 g of calcium hydroxide with a mean particle size (median diameter $D_{50}$) of 1 µm (oxygen-containing metal compound) to form a gel.

The gel was applied onto a flat surface of a glass plate, dried, and then peeled from the glass plate. The film thus obtained was rolled to a thickness of 110 µm and cut into a predetermined size, to obtain a polymer sheet.

(iv) Battery Production

The positive electrode and the negative electrode were layered with the polymer sheet between them, and then wound to form an electrode group. In the upper part of the electrode group, a positive electrode current collector plate was welded to the exposed part of the sintered nickel substrate of the positive electrode. Also, in the lower part of the electrode group, a negative electrode current collector plate was welded to the exposed part of the punched metal substrate of the negative electrode. Thereafter, the electrode group was placed into an AA-size battery container, and the central part of the negative electrode current collector plate was spot-welded to the bottom of the battery container.

Subsequently, an aqueous potassium hydroxide solution with a specific gravity of 1.3 g/ml was injected as the electrolyte into the battery container. An upper insulator plate was mounted on top of the electrode group, and the opening of the battery container was sealed with a sealing plate whose circumference was fitted with a gasket. The sealing plate was equipped with a safety valve and a positive electrode terminal. It is noted that before the sealing, the positive electrode current collector plate was electrically connected with a positive electrode cap of the sealing plate. In this way, an AA-size sealed battery with a nominal capacity of 1500 mAh in the initial state was completed. This battery was named Example battery K.

COMPARATIVE EXAMPLE 2

An AA-size sealed battery with a nominal capacity of 1500 mAh in the initial state was produced in the same manner as in Example 10, except for the use of a 200-µm-thick polypropylene non-woven fabric subjected to a hydrophilic treatment without using the polymer sheet obtained in Example 10. This battery was named battery L.

The batteries of Example 10 and Comparative Example 2 were tested for their cycle life. Specifically, each battery was charged at 200 mA for 10 hours and discharged at 1 A until the voltage dropped to a cut-off voltage of 1.0 V, and this cycle was repeated at 25° C. With the battery L of Comparative Example, its discharge capacity lowered to less than 50% of the initial capacity at the 100th cycle. On the other hand, with the Example battery K, its discharge capacity was not less than 60% of the initial capacity after 300 cycles.

The above results indicate that the alkaline storage batteries according to the Examples of the present invention exhibit remarkable improvements in self-discharge characteristics and cycle life after the repetition of charge and discharge cycles, regardless of the shape and construction of the positive and negative electrodes, because they have the separator layer including a water-absorbing polymer, a water repellent, an alkaline aqueous solution, and an oxygen-containing metal compound.

In the foregoing Examples, nickel-metal hydride storage batteries and nickel-zinc storage batteries were produced, but the present invention can produce the same effects also in nickel-cadmium storage batteries.

Also, it is needless to say that the capacity, size and the like of alkaline storage batteries are not limited to those exemplified in the foregoing Examples.

The alkaline storage batteries of the present invention are useful as the nickel-hydrogen batteries for use in hybrid vehicles, whose durability is particularly important, as the power source in back-up applications, in which long life is necessary, as the power source in tough applications such as power tools, and as the power source that needs to have high capacity. Also, although alkaline zinc storage batteries generally have shorter cycle life than nickel-metal hydride storage batteries, the cycle life of alkaline zinc storage batteries can be remarkably improved by the use of the separator layer according to the present invention.

In Example 10, magnesium hydroxide was used as the oxygen-containing metal compound instead of calcium hydroxide to produce a nickel-zinc storage battery. The performance of this battery was almost equivalent to that of Example 10.

Also, in Examples 1 and 10, the amount of each oxide (oxygen-containing metal compound) was changed. As a result, the remaining capacity rate was improved when the amount of the oxide was in the range of 0.02 to 0.5 part by weight per 100 parts by weight of the water-absorbing polymer.

Also, in Examples 1 and 10, the thickness of the separator layer was changed to produce various batteries. As a result, when the thickness of the separator layer was in the range of 20 to 200 µm, the resultant batteries had sufficient characteristics.

Further, in Examples 1 and 10, the kind of the water-absorbing polymer was changed to cross-linked potassium polymethacrylate, a potassium salt of cross-linked copolymer of acrylic acid/methacrylic acid and the like. The resultant batteries had performance equivalent to those in Examples 1 and 10.

Furthermore, in Examples 1 and 10, ethylene-tetrafluoroethylene copolymer, polyvinylidene fluoride, ethylene-chlorotrifluoroethylene copolymer, and the like were used instead of the polytetrafluoroethylene powder. The resultant batteries had performance equivalent to those in Examples 1 and 10.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An alkaline storage battery comprising:
a positive electrode containing nickel hydroxide; a negative electrode; a separator layer intervening between said positive electrode and said negative electrode; and an alkaline electrolyte,
wherein said separator layer comprises a water-absorbing polymer, a water repellent, an alkaline aqueous solution, and a scavenger capable of trapping an element which leaches from said negative electrode into said alkaline aqueous solution, and said scavenger comprises an oxygen-containing metal compound,
wherein the amount of said oxygen-containing metal compound contained in said separator layer is not less than 0.02 part by weight and not more than 5 parts by weight per 100 parts by weight of said water-absorbing polymer, and
wherein said separator layer is devoid of a core material comprising non-woven fabric.

2. The alkaline storage battery in accordance with claim 1, wherein said negative electrode is a hydrogen storage alloy electrode, a cadmium electrode or a zinc electrode.

3. The alkaline storage battery in accordance with claim 1, wherein said water-absorbing polymer comprises a cross-linked polymer having at least one kind of monomer unit selected from the group consisting of an acrylate unit and a methacrylate unit.

4. The alkaline storage battery in accordance with claim 1, wherein said water repellent comprises carbon fluoride and/or fluorocarbon resin.

5. The alkaline storage battery in accordance with claim 1, wherein said separator layer is bonded to at least one of a surface of said positive electrode and a surface of said negative electrode.

6. The alkaline storage battery in accordance with claim 1, wherein said separator layer further comprises a binder for holding said oxygen-containing metal compound, and said binder is at least one selected from the group consisting of polyethylene, polypropylene, carboxymethyl cellulose, styrene butadiene rubber and polyvinyl alcohol.

7. The alkaline storage battery in accordance with claim 1, wherein said separator layer has a thickness of 20 to 200 μm.

8. The alkaline storage battery in accordance with claim 1, wherein said oxygen-containing metal compound is at least one selected from the group consisting of a metal oxide and a metal hydroxide.

9. The alkaline storage battery in accordance with claim 1, wherein said oxygen-containing metal compound is at least one selected from the group consisting of zinc oxide, iron oxide, magnesium oxide, manganese oxide, aluminum oxide, chromium oxide, vanadium oxide, titanium oxide, cobalt oxide and calcium hydroxide.

10. A method for producing an alkaline storage battery, comprising the steps of:
producing a positive electrode containing nickel hydroxide;
producing a negative electrode;
preparing a mixture of a water-absorbing polymer, a water repellent, an alkaline aqueous solution, and an oxygen-containing metal compound, the amount of said oxygen-containing metal compound contained in said separator layer being not less than 0.02 part by weight and not more than 5 parts by weight per 100 parts by weight of said water-absorbing polymer;
forming said mixture into sheet form devoid of a core material comprising non-woven fabric to prepare a separator layer;
layering said positive electrode and said negative electrode with said separator layer interposed therebetween, to obtain an electrode group; and
assembling an alkaline storage battery using said electrode group.

11. A method for producing an alkaline storage battery, comprising the steps of:
producing a positive electrode containing nickel hydroxide;
producing a negative electrode;
preparing a mixture of a water-absorbing polymer, a water repellent, an alkaline aqueous solution, and an oxygen-containing metal compound, the amount of said oxygen-containing metal compound contained in said separator layer being not less than 0.02 part by weight and not more than 5 parts by weight per 100 parts by weight of said water-absorbing polymer;
applying said mixture onto at least one of a surface of said positive electrode and a surface of said negative electrode, to prepare a separator layer devoid of a core material comprising non-woven fabric;
layering said positive electrode and said negative electrode with said separator layer intervening therebetween, to obtain an electrode group; and
assembling an alkaline storage battery using said electrode group.

* * * * *